(12) United States Patent
Holland et al.

(10) Patent No.: US 11,226,836 B2
(45) Date of Patent: Jan. 18, 2022

(54) DYNAMIC RESTRUCTURING OF USER INTERFACE BASED ON USAGE DATA

(71) Applicant: EMC IP Holding Company LLC, Hopkinton, MA (US)

(72) Inventors: Elaine Holland, County Cork (IE); Paul J. McSweeney, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/877,822

(22) Filed: May 19, 2020

(65) Prior Publication Data

US 2021/0365274 A1 Nov. 25, 2021

(51) Int. Cl.
*G06F 9/451* (2018.01)
*G06F 11/34* (2006.01)
*G06F 9/54* (2006.01)

(52) U.S. Cl.
CPC ............ *G06F 9/451* (2018.02); *G06F 9/54* (2013.01); *G06F 11/3438* (2013.01)

(58) Field of Classification Search
CPC ............ G06F 9/451–454; G06F 3/048; G06F 11/34–3495; G06F 11/3438; G06F 9/54–548; H04L 67/22
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,968,369 B2 | 11/2005 | Veprinsky et al. | |
| 7,054,883 B2 | 5/2006 | Meiri et al. | |
| 10,853,100 B1* | 12/2020 | Kathpalia | G06N 20/00 |
| 2009/0150814 A1* | 6/2009 | Eyer | G06F 9/451 715/765 |
| 2012/0159322 A1* | 6/2012 | Ikegami | G06F 8/77 715/700 |
| 2018/0143744 A1* | 5/2018 | Movsisyan | G06F 8/38 |
| 2018/0239496 A1* | 8/2018 | Zhang | G06F 16/285 |
| 2019/0213061 A1* | 7/2019 | Campos-Guajardo | G06F 8/33 |
| 2020/0133441 A1* | 4/2020 | Smith | G06F 3/0481 |

OTHER PUBLICATIONS

Sandeep Chandrashekhara, et al., "Efficient Snapshot Activation," U.S. Appl. No. 15/969,048, filed May 2, 2018.

* cited by examiner

*Primary Examiner* — Liang Y Li
(74) *Attorney, Agent, or Firm* — Muirhead and Saturnelli, LLC

(57) ABSTRACT

Techniques for rendering information for display in a graphical user interface (GUI) of an application may include: navigating to a point in a workflow of the application; and responsive to navigating to the point in the workflow of the application, performing processing to render a component in the GUI of the application. The component may include user interface elements for actions. The processing may include: receiving priorities for the actions of the component, wherein each of the priorities denotes a priority of one of the actions relative to remaining ones of the actions and wherein the priorities are determined in accordance with frequencies of usage of the GUI of the application to perform the plurality of actions; organizing user interface elements for the actions in an arrangement in accordance with the priorities; and rendering the component using the arrangement of the user interface elements for the actions.

19 Claims, 13 Drawing Sheets

| Source | Area | UI Component | Action | Count | Priority |
|---|---|---|---|---|---|
| GUI | Storage | Storage Group List View | Provision Storage | 80 | 1 |
| CLI | Storage | Storage Group List View | Provision Storage | 20 | |
| REST | Storage | Storage Group List View | Provision Storage | 0 | |
| REST | Protection | SRDF Groups View | Create SRDF Group | 0 | |
| GUI | Protection | SRDF Groups View | Create SRDF Group | 100 | 1 |
| CLI | Protection | SRDF Groups View | Create SRDF Group | 0 | |
| GUI | Protection | SRDF Groups View | Modify SRDF Group | 20 | 2 |
| GUI | Protection | SRDF Groups View | Create SRDF Pairs | 10 | 3 |
| GUI | Protection | SRDF Groups View | Create Storage Group | 5 | 4 |

| | 201a | 201b | 201c | 201d | 201e | 201f |
|---|---|---|---|---|---|---|
| | Source | Area | UI Component | Action | Count | Priority |
| 202 | GUI | Storage | Storage Group List View | Provision Storage | 80 | 1 |
| 204 | CLI | Storage | Storage Group List View | Provision Storage | 20 | |
| 206 | REST | Storage | Storage Group List View | Provision Storage | 0 | |
| 208 | REST | Protection | SRDF Groups View | Create SRDF Group | 0 | |
| 210 | GUI | Protection | SRDF Groups View | Create SRDF Group | 100 | 1 |
| 212 | CLI | Protection | SRDF Groups View | Create SRDF Group | 0 | |
| 214 | GUI | Protection | SRDF Groups View | Modify SRDF Group | 20 | 2 |
| 216 | GUI | Protection | SRDF Groups View | Create SRDF Pairs | 10 | 3 |
| 218 | GUI | Protection | SRDF Groups View | Create Storage Group | 5 | 4 |

FIG. 5A

| | 401a | 401b | 401c | 401d | 401e | 401f |
|---|---|---|---|---|---|---|
| | Source | Area | UI Component | Action | Count | Priority |
| 402 | GUI | Storage | SG list view | Create SG | 100 | 1 |
| 404 | REST | Storage | SG list view | Create SG | 1 | |
| 406 | CLI | Storage | SG list view | Create SG | 1 | |
| 408 | GUI | Storage | SG list view | Provision | 89 | 3 |
| 410 | CLI | Storage | SG list view | Provision | 11 | |
| 412 | GUI | Storage | SG list view | Modify SG | 90 | 2 |
| 414 | REST | Storage | SG list view | Modify SG | 10 | |
| 416 | GUI | Storage | SG list view | Protect | 80 | 4 |
| 418 | REST | Storage | SG list view | Protect | 20 | |
| 420 | GUI | Storage | SG list view | Set Host I/O Limits | 9 | 5 |
| 422 | REST | Storage | SG list view | Set Host I/O Limits | 1 | |
| 424 | REST | Storage | SG list view | Modify Service Level | 4 | |
| 426 | REST | Storage | SG list view | Migrate | 2 | |
| 428 | GUI | Storage | SG list view | Migrate | 1 | |
| 430 | REST | Storage | SG list view | Delete | 1 | |

FIG. 6A

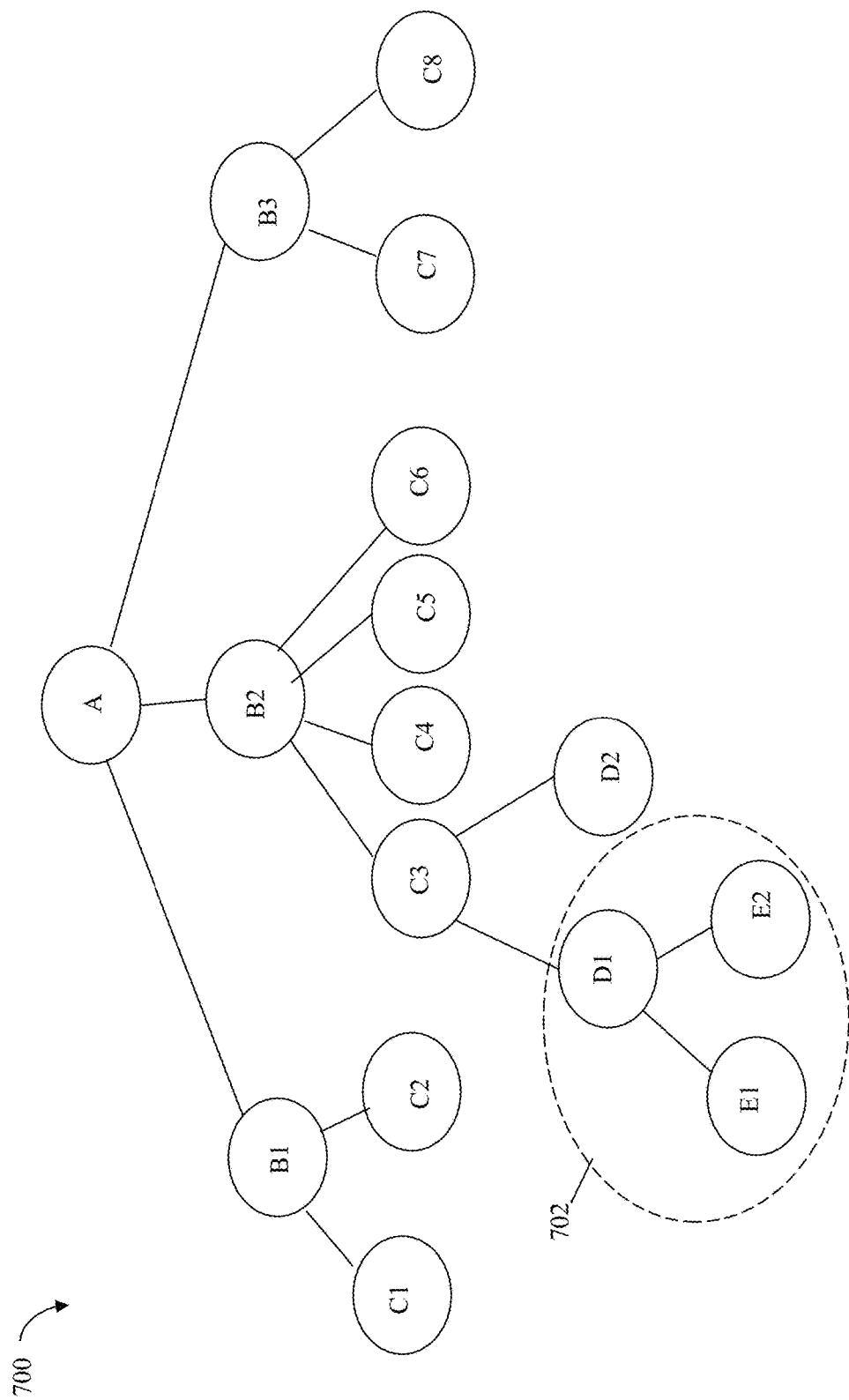

DYNAMIC RESTRUCTURING OF USER INTERFACE BASED ON USAGE DATA

BACKGROUND

Technical Field

This application generally relates to user interfaces (UIs), such as a graphical user interface (GUI).

Description of Related Art

Data storage systems may include resources used by one or more host systems. The data storage systems and the host systems may be interconnected by one or more communication connections such as in a network. These resources may include, for example, data storage devices such as those included in the data storage systems. These data storage systems may be coupled to the one or more host systems where the data storage systems provide storage services to each host system. Multiple data storage systems from one or more different vendors may be connected and may provide data storage services for the one or more host systems.

A host may perform a variety of data processing tasks and operations. For example, an application may executed on the host and the application may issue I/O (input/output) operations, such as data read and write operations, sent to the data storage system.

The host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. The host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for rendering information for display in a graphical user interface (GUI) of an application comprising: navigating to a point in a workflow of the application; and responsive to navigating to the point in the workflow of the application, performing processing to render a first component in the GUI of the application, wherein the first component includes a plurality of user interface elements for a plurality of actions, wherein the processing includes: receiving a plurality of priorities for the plurality of actions of the first component, wherein each of the plurality of priorities denotes a priority of one of the plurality of actions relative to remaining ones of the plurality of actions and wherein the plurality of priorities is determined in accordance with frequencies of usage of the GUI of the application to perform the plurality of actions; organizing the plurality of user interface elements for the plurality of actions in a first arrangement in accordance with the plurality of priorities; and rendering the first component using the first arrangement of the plurality of user interface elements for the plurality of actions. A request to perform any of the plurality of actions may be issued from one of a plurality of allowable interfaces including the GUI of the application. The plurality of allowable interfaces further may include an application programming interface (API) and a command line interface (CLI).

In at least one embodiment, processing may include analyzing usage information indicating a number of times each of the plurality of allowable interfaces has been used to perform each of the plurality of actions; and determining the plurality of priorities in accordance with said analyzing of the usage information. The usage information may include a plurality of counts, and wherein said determining the plurality of priorities may use the plurality of counts denoting frequencies of usage of the GUI of the application to perform the plurality of actions, and wherein each of the plurality of counts may denote a frequency of usage of the GUI of the application to perform a different one of the plurality of actions. The plurality of counts may include a first count indicating a frequency of usage of the GUI of the application for performing a first action of the plurality of actions and a second count indicating a frequency of usage of the GUI of the application for performing a second action of the plurality of actions. The first count may be greater than the second count. The first action may have a first priority of the plurality of priorities and the second action may have a second priority of the plurality of priorities, and wherein the first priority may be higher than the second priority. The first component may include only N user interface elements for N of the plurality of actions having the highest N priorities of the plurality of priorities, and wherein N may be an integer greater than 0.

In at least one embodiment, the usage information may include a second plurality of counts denoting frequencies of usage of the API to perform the plurality of actions, and wherein the usage information may also include a third plurality of counts denoting frequencies of usage of the CLI to perform the plurality of actions. First processing may be performed that includes: using the plurality of counts, the second plurality of counts, and the third plurality of counts to determine a plurality of percentages of time the GUI of the application is used to perform said plurality of actions, where each of the plurality of percentages corresponds to a different one of the plurality of actions; for each of the plurality of percentages of time, determining whether said each percentage of time corresponding to one of the plurality of actions is at least a minimum percentage; and responsive to determining said percentage of time for corresponding to said one action is at least the minimum percentage, determining a priority for said one action, and otherwise not determining a priority for said one action. The GUI of the application may be used to perform a third action a third percentage of time that is less than the minimum percentage, and processing includes not determining a priority for the third action. The priority for said each action may be a relative priority based on a ranking of the plurality of counts denoting frequencies of usage of the GUI of the application to perform the plurality of actions.

In at least one embodiment, the application may be a data storage management application. Each of the plurality of actions may be a data storage system management request sent over a control path. Prior to navigating to the point in the workflow of the application, the first component may have the plurality of user interface elements for the plurality of actions organized in a second arrangement that is different than the first arrangement. The processing may include: determining whether a user, that has navigated to the point in the workflow of the application, has logged into the application at least a minimum number of times within a specified time period; and responsive to determining that the user has logged into the application at least the minimum number of times within the specified time period, performing said receiving, said organizing and said rendering the first component using the first arrangement, and otherwise rendering the first component using the second arrangement of the plurality of user interface elements of the plurality of actions.

BRIEF DESCRIPTION OF THE DRAWINGS

Features and advantages of the techniques herein will become more apparent from the following detailed description of exemplary embodiments thereof taken in conjunction with the accompanying drawings in which:

FIGS. 5A and 6A are examples of tables that may be used in an embodiment in accordance with the techniques herein.

FIGS. 8A and 8B are examples illustrating use of the techniques herein to restructure the navigational workflow of an application having a GUI in an embodiment in accordance with the techniques herein.

DETAILED DESCRIPTION OF EMBODIMENT(S)

Figure 1:
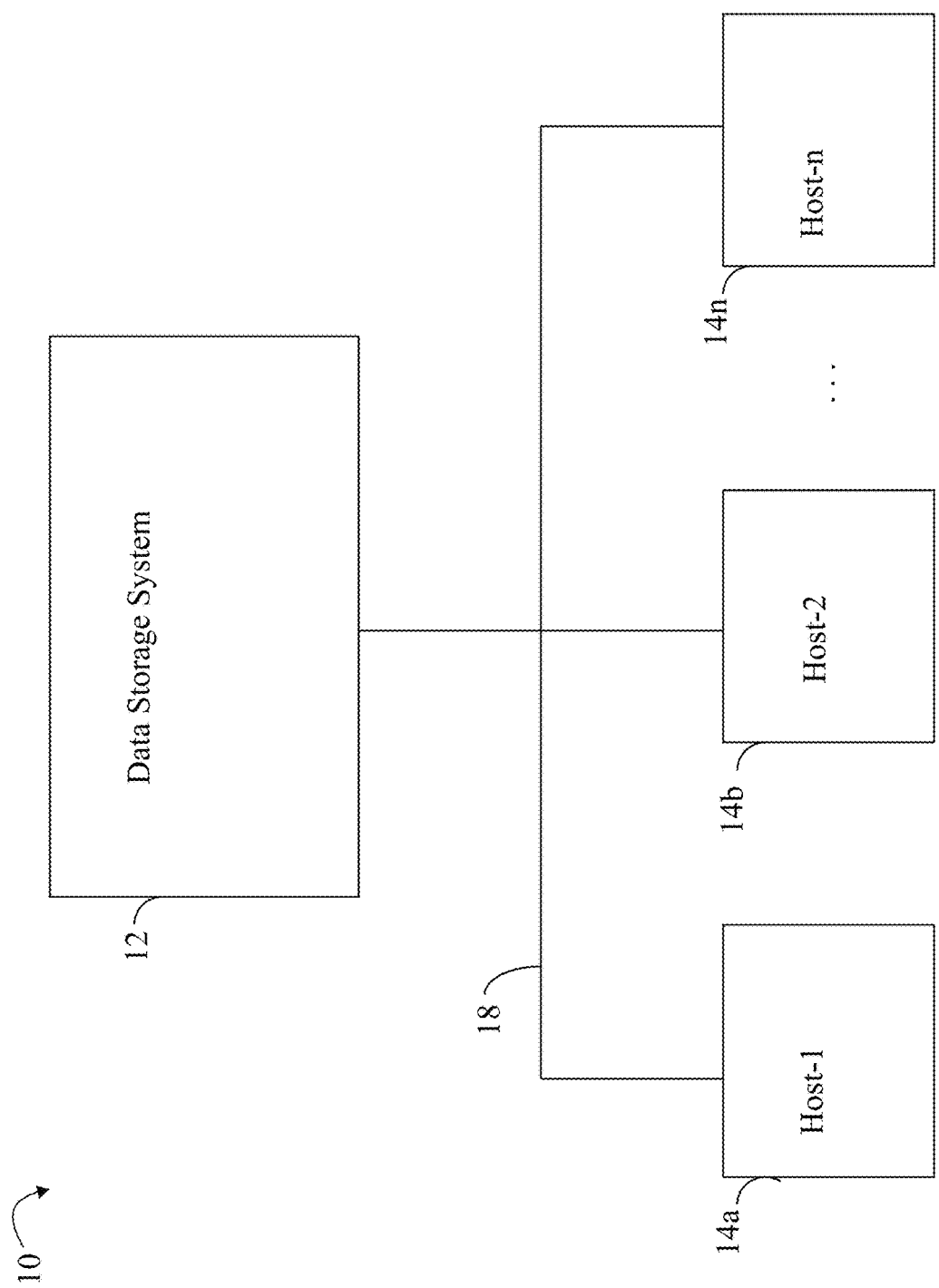
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connection known in the art. For example, the communication medium 18 may be an intranet, network or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts and the data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
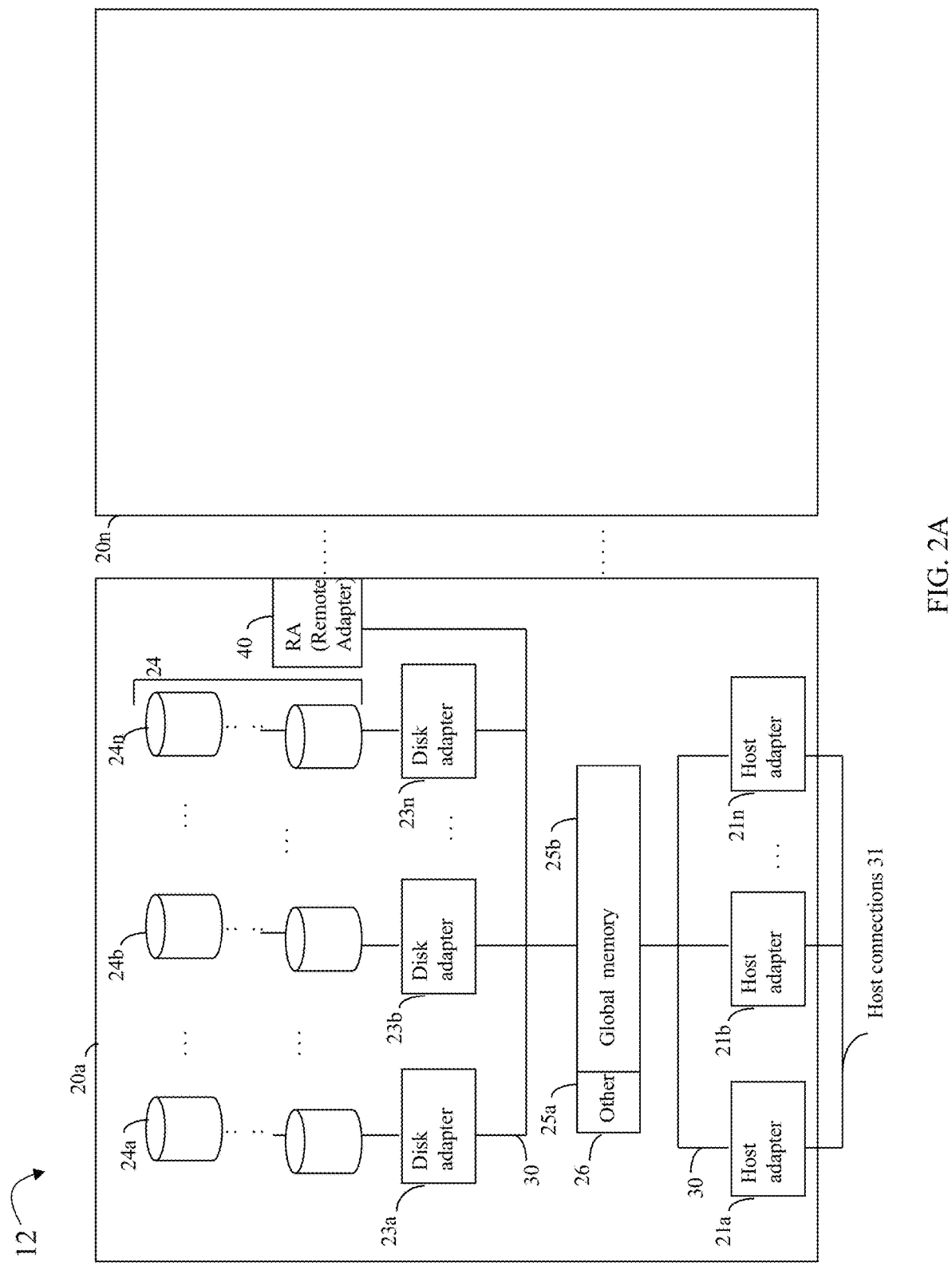
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of the disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of a suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices, or more generally solid state drives (SSDs), such as SSDs that communicate using the NVMe protocol, and the like.

Also shown in the storage system 20a is an RA or remote adapter 40. The RA may be hardware including a processor used to facilitate communication between the data storage systems, such as between two of the same or different types of data storage systems.

The system 20a may also include one or more host adapters ("HAs") or directors 21a-21n. Each of these HAs may be used to manage the communications and data operations between one or more host systems and the global memory. In an embodiment, the HA may be a Fibre Channel Adapter (FA) or other adapter which facilitates host communication. Generally, the directors may also be characterized as the different adapters, such as the HAs (including FAs), DAs, RAs and the like, as described herein. Components of the data storage system, such as an HA, which may communicate with a host (e.g., receive the host I/O commands and send the responses to the host) may also be referred to as front end components. A DA is an example of a backend component of the data storage system which may communicate with a front end component. In connection with the data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other the disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to the data may be provided to one or more host systems from what the host systems view as a plurality of logical devices or logical units. A logical unit (LUN) may be characterized as a disk array or a data storage system reference to an amount of disk space that has been formatted and allocated for use by one or more hosts. A logical unit may have a logical unit number that is an I/O address for the logical unit. As used herein, a LUN or LUNs may refer to the different logical units of storage such as logical devices which may be referenced by such logical unit numbers. The LUNs may or may not correspond to the actual or physical disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and the LUN(s) residing thereon.

In at least one embodiment, a LUN may a thick or regular LUN in which the physical storage for the full capacity of the LUN may be provisioned when the LUN is created. For a thick LUN, the entire logical address space of the LUN may be mapped to physical storage locations when the LUN is initially created. As a variation in such an embodiment, a LUN may alternatively be a thin LUN or virtually provisioned LUN. With a thin LUN, the physical storage for the LUN may be allocated in chunks, such as slices, on demand the first or initial time there is a write to a logical address portion that is mapped to a particular slice. A logical address portion that is mapped to a slice of physical storage may or may not include data stored in the entire logical address portion. Thus, at any point in time, a physical storage slice that is mapped to a logical address portion or subrange of a thin LUN may include data stored on various portions of the slice depending on what particular logical addresses mapped to the slice have been written to. In at least one embodiment, both thick or regular LUNs and thin or virtually provisioned LUNs may be supported and thus configured in the data storage system.

The DA physically accesses the back-end non-volatile storage devices, such as the physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to a cache memory (e.g., such as may be included in the component designated as 25b) and marked as write pending. Once written to the cache, the host may be notified that the write operation has completed. At a later point time, the write data may be destaged from the cache to the physical storage device, such as the non-volatile physical storage device (e.g., the PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time (RT). If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management technique may be used to maintain the cache, for example, such as in determining how long data remains in the cache, whether to prefetch data, selecting data stored in the cache for eviction, and the like.

Figure 2B:
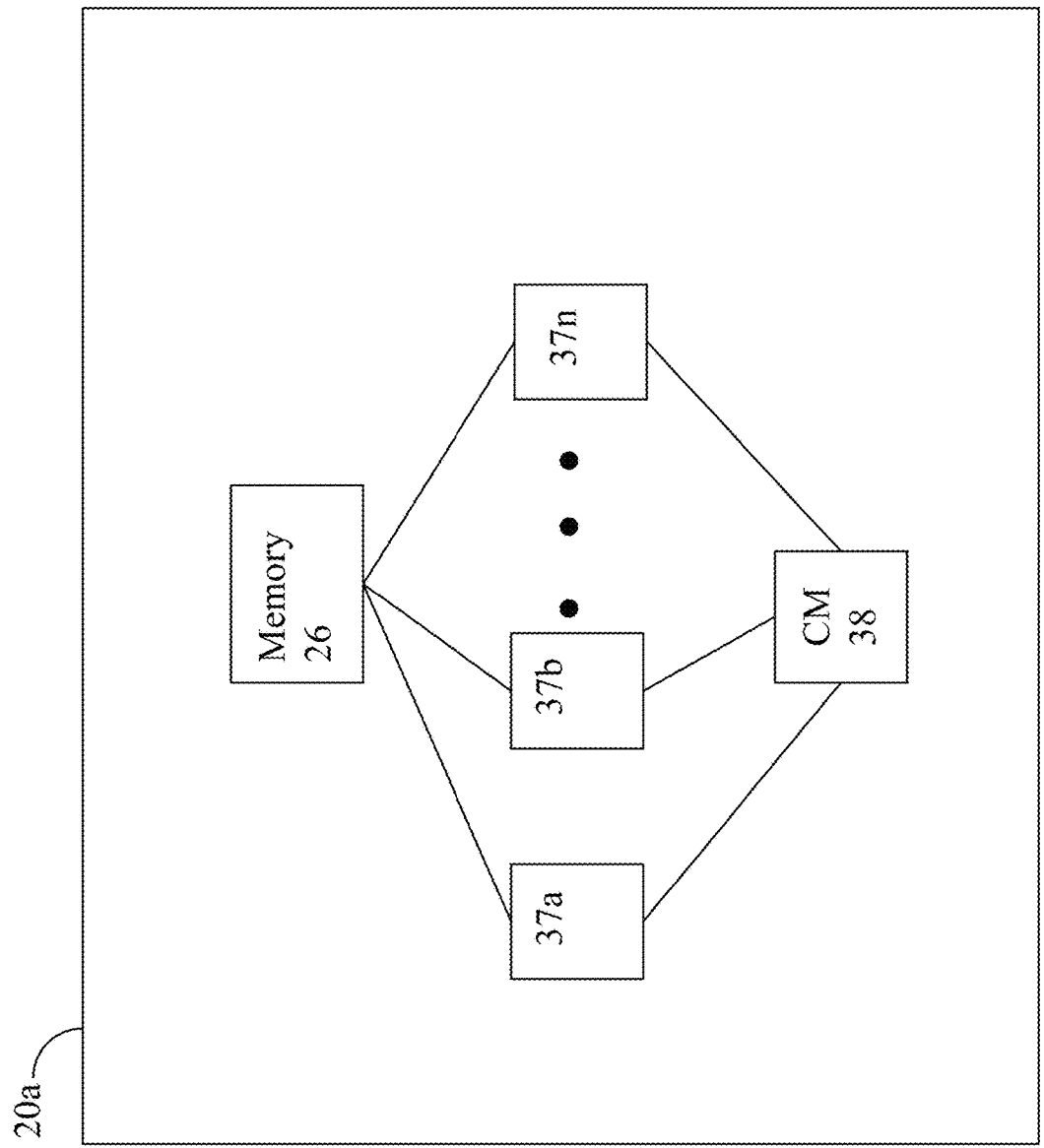
FIG. 2B is a representation of the logical internal communications between the directors and memory included in one embodiment of the data storage system of FIG. 2A.

Referring to FIG. 2B, shown is a representation of the logical internal communications between the directors and the memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX (multiplexer)/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with the techniques herein. Those skilled in the art will appreciate that the techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with the techniques herein, the components such as the HAs, the DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data storage system may provide various data services. For example, in at least one embodiment in accordance with the techniques herein, a data storage system may provide one or more data reduction services in efforts to reduce the size of the stored data, for example, stored on the backend non-volatile storage PDs of the data storage system. In at least one embodiment, the data reduction services may include compression.

In at least one embodiment in accordance with the techniques herein, a data storage system may provide different data replication technologies, facilities or services. Such replication technologies may be characterized as local or remote. Additionally, a replication technology may provide for creating a complete, physical bit for bit copy or replica of data (that is local and/or remote). A replication technology may provide for creating a logical or virtual point in time copy of a data source such as using a snapshot technology or facility known in the art. Such logical copies of a data source are not a complete physical copy of the data source. Rather, different techniques such as a snapshot technique may be used to create a logical or virtual copy of the data source. For example, a snapshot facility may be used in an embodiment in accordance with techniques herein to create a snapshot characterized as a logical point in time copy of data. In connection with a logical device, or more generally any storage entity, software of a data storage system may provide one or more data replication services or facilities whereby a snapshot is one such facility that may be used to create point in time snapshot of a logical device such as a LUN for non-disruptive backup. A snapshot may appear like a normal logical device and may be used for backup, testing, and the like.

Snapshots may rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device may be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

In at least one embodiment in accordance with techniques herein, the snapshot facility may be TimeFinder® SnapVX™ by Dell Inc. using the COFW or ROW techniques as noted above. With ROW, when a source volume or logical device is written to and the original data of the source volume or logical device needs to be preserved for a snapshot(s), the new write is accepted and asynchronously written to a new location. The source volume now points to the new data while the snapshot(s) continue to point to the original data (e.g., the snapshot delta) in its original location. For example, U.S. patent application Ser. No. 15/969,048, filed May 2, 2018, "Efficient Snapshot Activation", Chandrashekhara et al, which is incorporated by reference herein in its entirety, describes in more detail processing that may be performed in at least one embodiment in connection with establishing or creating a targetless snapshot as well as a linked snapshot (e.g., linked to a logical device identifier), processing performed in connection with servicing I/O operations directed to the snapshot and source logical device, and other processing.

In at least one embodiment, the replication facilities may include remote data replication facilities such as the Symmetrix Remote Data Facility (SRDF®) products provided by Dell Inc. SRDF® is a family of products that facilitates the data replication from one storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein. For a local copy of a LUN or logical device on a first data storage system, SRDF provides for automatically creating and maintaining a remote physical copy on a remote data storage system. The remote copy may be used, for example, in the case of a site disaster of the first data storage system.

Data storage device communication between data storage systems using the SRDF® product is described, for example, in U.S. Pat. Nos. 5,742,792, 5,544,347, and 7,054,883, all of which are incorporated by reference herein. With the SRDF® product, a user may denote a first storage device, such as R1, as a master storage device and a second storage device, such as R2, as a slave storage device. Other incarnations of the SRDF® product may provide a peer to peer relationship between the local and remote storage devices. For example, the host may interact directly with the device R1 of first local data storage system, but any data changes made are automatically provided to the R2 device of a second remote data storage system using the SRDF® product. In operation, the host may read and write data using the R1 volume in the first data storage system, and the SRDF® product may handle the automatic copying and updating of data from R1 to R2 in second remote data storage system. The SRDF® replication functionality may be facilitated with the RAs provided at each of the foregoing first and second data storage systems. Performing remote data communications using the SRDF® product over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein.

With synchronous RDF replication mode, an acknowledgement is not returned to a host that writes to an R1 device until the write data has been stored in the R1 system cache and an acknowledgement is also received from the R2 system that the write has been replicated on the R2 device. In at least one embodiment, the R2 system may return an acknowledgement to the R1 system that the write has been replicated once the write data is stored in the cache on the R2 system. At some later point in time, the write data may be stored on non-volatile storage provisioned for the R2 device. With asynchronous RDF replication mode for a host write to an R1 device, the R1 system stores the write data in the R1 system cache, and then may return an acknowledgement to the host without waiting for the above-noted R2 system acknowledgement regarding replication of the write data on the R2 system/device.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from the data storage management software, such as a data storage system management application, executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

Described in following paragraphs are techniques that may be used to dynamically restructure or reorganize various areas, views or portions of a GUI displayed to a user. In at least one embodiment, the restructuring or reorganization of one or more UI components displayed to the user may be based on actions of the particular user. As a variation, the restructuring or reorganization of one or more UI components displayed to the user may be based collectively on actions of the particular user as well as other users of the data storage system management application.

The actions may be requests to perform data storage system management operations or tasks that may be issued from any one of multiple supported interfaces or sources. For example, in at least one embodiment, an action to request performance of a data storage system management operation may be initiated using any of 3 supported interfaces or sources. The supported interfaces or sources may include the data storage management system GUI, an application programming interface (API), and a command line interface (CLI). Code of an application or script may makes calls based on the API or CLI, where such calls result in runtime transfer of control to code in a library of code to perform data storage management operations.

In at least one existing system, the API may be, for example, the Unisphere Management REST API that conforms to Representational State Transfer (REST) design principles, which is a frequent choice for many web-based APIs. As known in the art, in a REST API, each resource type (e.g., object) has a unique Universal Resource Identifier (URI), and each resource instance has a unique identifier. A user interacts with the resources exposed by the API by accessing resources using HTTP GET, POST, and DELETE requests. Rather than use the GUI to perform an action, the user may, for example, write a script or other code module that makes suitable REST API calls or CLI calls to perform the desired data storage management operations.

Thus, in at least one embodiment, a user may issue a request to perform a data storage management operation from any one or more of the supported interfaces or sources. The actions may be mapped to UI components including the actions. Data regarding usage of the various supported interfaces or sources to perform the actions may be collected and analyzed over a defined period of time. Based on this analysis, the UI components of the GUI may be reorganized or restructured to have the most highest prioritized actions higher up on the usability flow in the GUI of the data storage system management application. For example, a drop down menu may be a UI component that includes a list of actions. The list of actions may be ordered within the menu from highest to lowest priority with the highest priority actions appearing at the top of the list, and with the lowest priority actions appearing at the bottom of the list. As another example, a view of a GUI may include a UI component of 4 buttons or generally UI elements that may be selected by a user to perform a particular action. The UI component of the view may also include a drop down list or menu of actions. The UI component may be structured to include the 4 actions with the highest priority as the 4 buttons, and include any remaining actions listed in the drop down list or menu in an order based on priorities of the remaining actions. The remaining actions may be sorted, from highest to lowest priority, and may appear in the list, from top to bottom based on the sorted priority ordering.

In at least one embodiment, different areas or categories may be defined for the data storage system management application, or more generally any application. The different areas may include multiple views that correspond to different pages of information that may be displayed at various points in the application workflow. The application workflow may generally denote the navigational workflow of a user through the application based on user actions and selections made using the GUI of the application. Based on such user actions and selections, and possibly the outcome or results of such actions, different information may be displayed at different points in time to the user on the GUI display. Each page or view of information displayed may include one or more UI components. The UI components may present selectable UI elements for different actions that can be performed at the particular application workflow point associated with the displayed page or view.

When a user performs an action using one of the defined interfaces or sources, the details of the action may be recorded and stored, for example, in a database. The details recorded for the action may identify the particular interface or source used to initiate the action, the area or category associated with the action, and the particular UI component including the action. In at least one embodiment, a service, sometimes referred to as the usability service, may perform processing that monitors and analyzes the usage data collected regarding the requested actions made by the users of the data storage system. For example, in at least one embodiment, the service may perform a daily analysis of the information regarding the actions performed for a prior defined time period, such as the prior week.

In at least one embodiment, the audit log of the data storage system may include the details of any CLI commands executed. The audit log may also be stored in the database along with the other details of recorded actions for other interfaces or sources from which actions may be initiated.

Based on the analysis of the collected information for the actions performed, the usability service may generate a table of information that is also stored in the database. In at least one embodiment, the table may include entries for the different actions of the different UI components. In at least one embodiment, each entry of the table may identify a particular action, a source or interface from which the particular action is issued, a UI component including the particular action, an area or category including the UI component, a count denoting a frequency of the number of times the particular action has been issued using the particular source or interface during the analysis time period, such as one week, and a priority of the particular action.

In at least one embodiment, the usability service may calculate a percentage for each action count of an entry of the table. The percentage for a particular count of an action included in a particular UI component may be based on a ratio of the action's count for the data storage management GUI with respect to a total action count for the particular action for all 3 supported interfaces or sources. For example, provision storage may be an action included in a UI component, where the action has 3 corresponding entries in the table for the 3 different sources or interfaces from which the provision storage action may be initiated. For the 3 entries, 3 corresponding percentages may be determined based on the counts of the 3 entries. For example, assume entry 1 includes a count of 0 for using the REST API interface to perform the provision storage action, entry 2 includes a count of 0 for using the CLI interface to perform the provision storage action, and entry 3 includes a count of 20 for using the data storage system management application GUI to perform the provision storage action. In this example, entries 1 and 2 both have an associated percentage of 0%, and entry 3 has an associated percentage of 100%.

In at least one embodiment, the usability service may only determine a priority for an action if the percentage associated with the data storage system management GUI as the source of the action is at least a minimum percentage, such as 80% or some other suitable minimum percentage. For each UI component including multiple actions associated with percentages meeting the minimum percentage requirements noted above, a priority may be determined for each of the multiple actions based on the count associated with each action. Thus, for a UI component, processing may first identify actions of the UI component that are: 1) performed using the data storage system management GUI; and 2) have an associated percentage that is at least a minimum percentage, such as 80%. Subsequently, the identified actions for the UI component may be relatively prioritized based on the counts associated with the identified actions. The identified actions may be ranked, from highest count to lowest count, where the highest count has the highest relative ranking and priority, and where the lowest count has the lowest relative ranking and priority. In this manner, actions of a UI component that have been performed using the data storage system management application GUI and have an associated percentage that is at least the minimum threshold percentage may be assigned a relative priority based on counts associated with such actions.

As an alternative for determining priorities of actions of a UI component, the counts for the actions issued using the data storage management GUI may be ranked, from highest count to lowest count, where the highest count has the highest relative ranking and priority, and where the lowest count has the lowest relative ranking and priority. In this alternative embodiment, there is no minimum percentage requirement or criterion applied for use in filtering the particular counts and actions for which a priority is determined.

An embodiment in accordance with the techniques herein may analyze and use the collected usage data to determine the most important actions and reorganize the UI components of the GUI accordingly. As discussed herein, an embodiment in accordance with the techniques herein may use the collected action usage data stored in the database to determine what actions were performed using the data storage system management application GUI as opposed to any other supported source or interface. The usability service may analyze the collected action usage data to determine priorities of actions and store such priorities along with other information about the actions in a table in the database. Information in the table may be subsequently used to reorganize or restructure portions of the data storage management application's GUI to improve the usability of the application's GUI. Such reorganization and restructuring may include, for example, removing or omitting actions from the GUI as well as reordering and repositioning UI elements for the actions within the GUI based on usage information.

In at least one embodiment, the data storage management application may execute in the context of a browser where the browser windows and views provide the GUI for the application. What will now be described is processing as may be performed in at least one embodiment in accordance with the techniques herein when using a GUI of a data storage management application for managing a data storage system. The actions that are requests to perform data storage system management tasks or operation may be issued using various UI controls of the data storage management application as well as other sources or interfaces. In such an embodiment, the commands may be issued over the control path.

The foregoing and other aspects of the techniques herein are described in more detail in following paragraphs.

Figure 3:
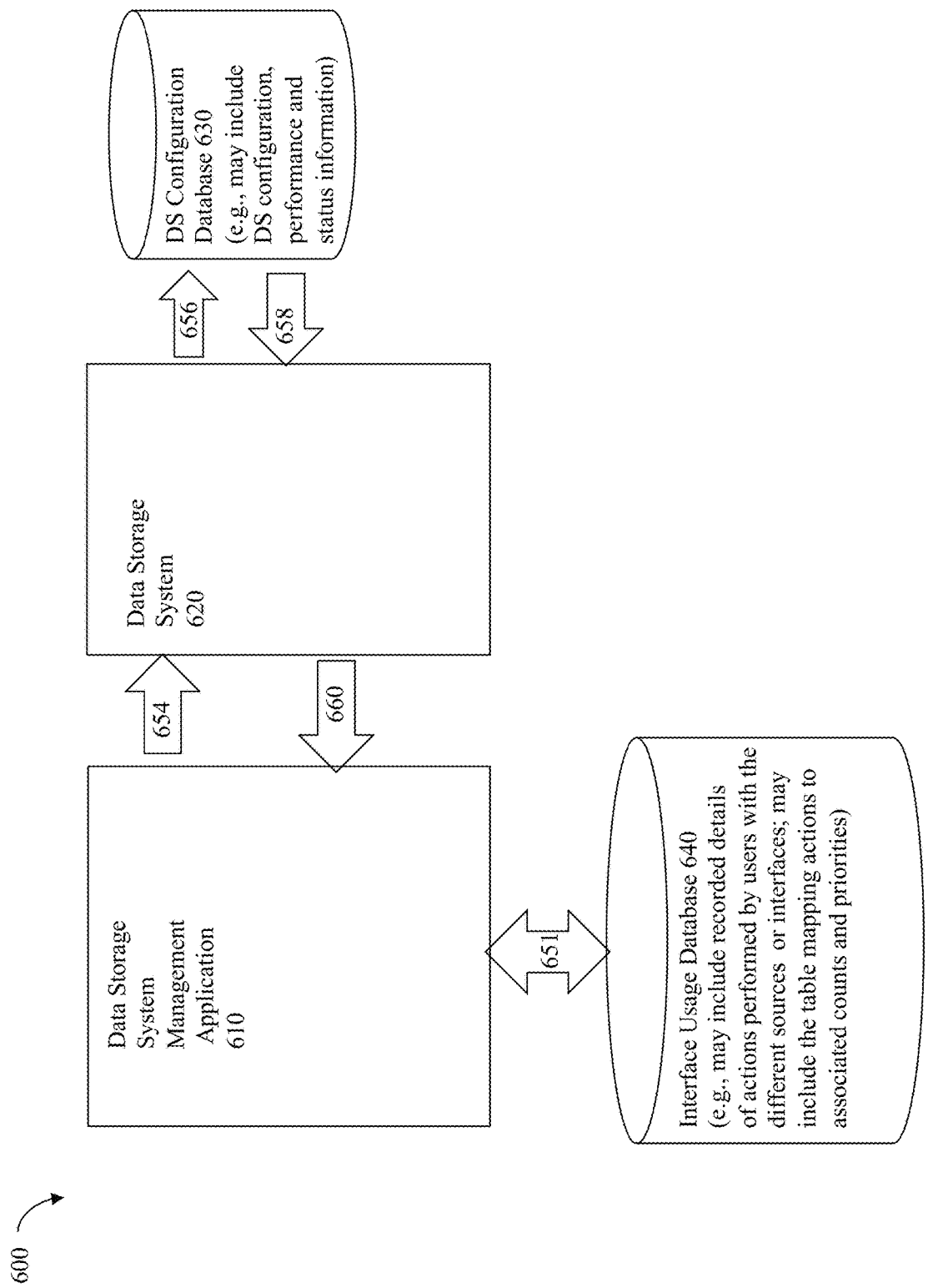
FIG. 3 is an example illustrating components and data flow in an embodiment in accordance with the techniques herein.

Referring to FIG. 3, shown is an example 600 of systems and components that may be used in an embodiment in accordance with the techniques herein. The example 600 includes a data storage system management application 610, a data storage system 620, a data storage system (DS) configuration database 630, and an interface usage database 640.

Details regarding the various user actions performed using the supported interfaces or sources may be recorded in the interface usage database 640. Additionally, the table of information regarding the various actions and associated counts and priorities may be stored in the database 640. Examples of instances of the table are described in more detail elsewhere herein in connection with other figures. The database 640 may be stored on a host, or more generally a computer system, in communication with the data storage system management application 610. In at least one embodiment, code, such as of the usability service described herein, may be executed on the host or computer system to periodically analyze the collected interface usage data regarding the various actions performed and create an updated instance of the table. In at least one embodiment, the table may be recreated daily. When creating the table, the collected usage data regarding the various actions may be analyzed for a period of time, such as data collected within the last week. The data storage system management application 610 may access (651) the current instance of the table from the database 640 as needed in connection with obtaining data used in performing the techniques herein for restructuring the GUI of the application 610.

In connection with application 610, in at least one embodiment, the application 610 may issue a request (654) to the data storage system 620 for various information needed. The request may be issued in response to a user request or command made via the GUI of the application 610. For example, the user may issue a request to view information about the data storage system 620 in the GUI of the application 610. The request 654 may be issued to request the desired information for display on the GUI of the application. In response to receiving the request 654, the data storage system 620 may issue one or more requests 656, such as database queries, to the database 630 to retrieve information needed to service the user request or command. A response including the requested information may be returned 658 from the database 630 to the data storage system 620, and then further returned 660 to the data storage system management application 110.

The user request issued via the GUI of the application may also modify information in the database 630. In this case, the application 610 may issue the request 654 to the data storage system 620, where the request 654 includes the information to be written to the database 630. Subsequently, the data storage system 620 may issued one or more requests 656, such as database commands, to the database 630 to store the desired information. A response may be returned 658 from the database 630 to the data storage system 620, and then further returned 660 to the data storage system management application 110.

In at least one embodiment in accordance with the techniques herein, the data storage system management application 110 may execute in the context of a browser.

The DS configuration database 630 may generally include information about the data storage system 620. For example, in at least one embodiment, the database 130 may include data storage system configuration, performance, and status information. For example, the database 630 may include data storage system configuration information regarding the various physical and logical storage objects or entities in the data storage system (e.g., configured SGs, provisioned LUNs, configured RAID groups). The database 630 may, for example, identify what LUNs are included in an SG, what hosts and initiator ports of hosts have access to particular SGs, what LUNs or SGs are exposed over which particular front end (FE) data storage system ports of HAs or FAs, what one or more pools of RAID groups the LUNs have storage provisioned from, what physical storage devices are included in each pool and associated RAID group configuration, the particular RAID level of a RAID group, what is the capacity of a LUN, what is the amount of used and free storage of SGs, LUNs, and RAID groups, and the like. Information regarding the performance of the physical and/or logical storage entities in the data storage system and the current configuration of the physical and/or logical storage entities in the data storage system may be used, for example, in connection with displaying information about a particular primary object instance and its related object instances.

In at least one embodiment, the database 630 may be stored on the data storage system 620. As a variation, the database 630 may be located on a different system, such as at a different location accessible via a network connecting the data storage system 620 and the database 630.

Figure 4A:
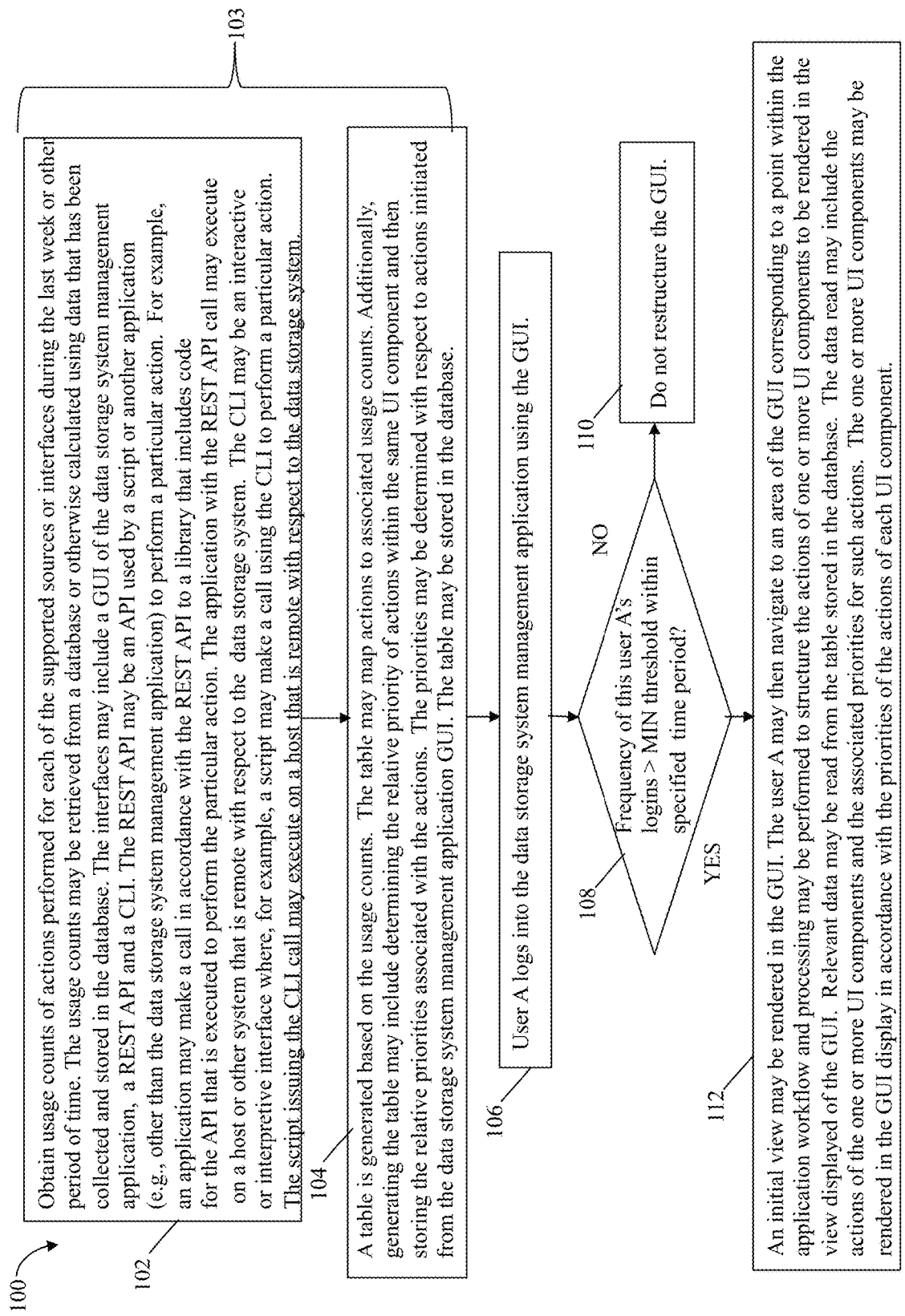
FIGS. 4A and 4B are flowcharts of processing steps that may be performed in an embodiment in accordance with the techniques herein.
Figure 4B:
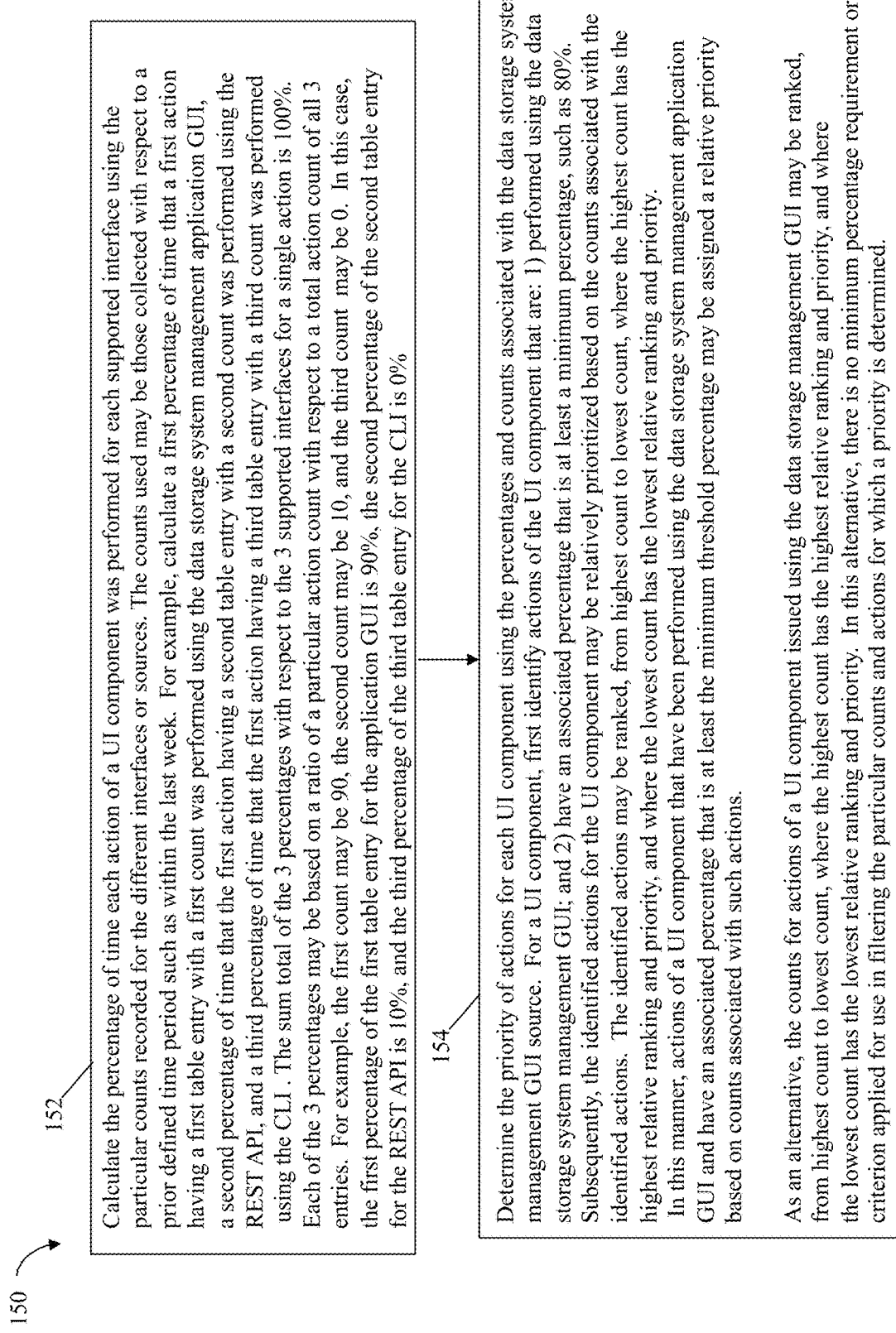

Referring to FIGS. 4A and 4B, shown are flowcharts of processing steps that may be performed in an embodiment in accordance with the techniques herein. In the step 102, processing may be performed to obtain usage counts of actions performed for each of the supported sources or interfaces during the last week or some other period of time. The usage counts may be retrieved, for example, from the interface usage database 640 or otherwise calculated using data that has been collected and stored in the database 640.

Consistent with discussion herein in at least one embodiment, the interfaces may include a GUI of the data storage system management application, a REST API and a CLI. The REST API may be an API used by a script or another application (e.g., other than the data storage system management application) to perform a particular action. For example, an application may make a call in accordance with the REST API to a library that includes code for the API that is executed to perform the particular action. The application with the REST API call may execute on a host or other system that is remote with respect to the data storage system. The CLI may be an interactive or interpretive interface where, for example, a script may make a call using the CLI to perform a particular action. The script issuing the CLI call may execute on a host that is remote with respect to the data storage system.

From the step 102, control proceeds to the step 104. At the step 104, a table may be generated based on the usage counts determined in the step 100. The table may map actions to associated usage counts. Additionally, generating the table may include determining the relative priority of actions within the same UI component and then storing the relative priorities associated with the actions. The priorities may be determined with respect to actions initiated from the data storage system management application GUI. The table may be stored in the database 640.

In at least one embodiment, the steps 102 and 104 as denoted collectively by the element 103 may be periodically repeated. For example, in at least one embodiment, the processing of 103 may be repeated on a daily basis to generate a new instance of the table stored in the database 640 every day. In at least one embodiment, the usability service described elsewhere herein may performed the processing of 103. From the step 104, control proceeds to the step 106.

At the step 106, a user A may log into the data storage system management application using the GUI. From the step 106, control proceeds to the step 108 where a determination is made as to whether the frequency of user A's logins exceed a minimum (MIN) threshold number of logins within a specified period of time. Any suitable MIN threshold and period of time may be used. For example, in at least one embodiment, the step 106 may determine whether user A's logins exceed 10 logins within the past week. If the step 108 evaluates to no, control proceeds to the step 110 and a determination is made that the GUI of the data storage system management application is not restructured for the user A at this time. Although not illustrated in the flowchart 100 of FIG. 4A, processing may be performed to render views in the GUI for user A without using the techniques herein. If the step 108 evaluates to yes, control proceeds to the step 112.

In the step 112, an initial view of the application may be displayed in the GUI to the user. Subsequently the user A may navigate to an area of the GUI corresponding to a point within the application workflow and processing may be performed to structure the actions of one or more UI components to be rendered in the view displayed of the GUI. Relevant data may be read from the table stored in the database. The data read may include the actions of the one or more UI components and the associated priorities for such actions. The one or more UI components may be rendered in the GUI display in accordance with the priorities of the actions of each UI component.

The step 112 of the FIG. 4A describes structuring or restructuring the actions of UI components in response to a user navigating to a particular area of the GUI. Generally, such restructuring of the UI components in accordance with the techniques herein may be repeatedly performed responsive to each suitable user interaction, such as each user navigation in the GUI.

Referring to FIG. 4B, the flowchart 150 includes processing steps that may be performed by the usability service in connection with analyzing the collected usage information to determine the priorities of actions stored in the table in the database 640.

At the step 152, processing may be performed to calculate the percentage of time each action of a UI component was performed for each supported interface using the particular counts recorded for the different interfaces or sources. The counts used may be those collected with respect to a prior defined time period such as within the last week. For example, calculate a first percentage of time that a first action having a first table entry with a first count was performed using the data storage system management application GUI, a second percentage of time that the first action having a second table entry with a second count was performed using the REST API, and a third percentage of time that the first action having a third table entry with a third count was performed using the CLI. The sum total of the 3 percentages with respect to the 3 supported interfaces for a single action is 100%. Each of the 3 percentages may be based on a ratio of a particular action count with respect to a total action count of all 3 entries. For example, the first count may be 90, the second count may be 10, and the third count may be 0. In this case, the first percentage of the first table entry for the application GUI is 90%, the second percentage of the second table entry for the REST API is 10%, and the third percentage of the third table entry for the CLI is 0%. From the step 152, control proceeds to the step 154.

At the step 154, processing may be performed to determine the priority of actions for each UI component using the percentages (determined in the step 152) and counts associated with the data storage system management GUI source. For a UI component, first identify actions of the UI component that are: 1) performed using the data storage system management GUI; and 2) have an associated percentage that is at least a minimum percentage, such as 80%. Subsequently, the identified actions for the UI component may be relatively prioritized based on the counts associated with the identified actions. The identified actions may be ranked, from highest count to lowest count, where the highest count has the highest relative ranking and priority, and where the lowest count has the lowest relative ranking and priority. In this manner, actions of a UI component that have been performed using the data storage system management application GUI and have an associated percentage that is at least the minimum threshold percentage may be assigned a relative priority based on counts associated with such actions.

As an alternative in at least one embodiment, the processing of the step 152 may be omitted and the step 154 may alternatively perform processing that ranks, from highest count to lowest count, the counts for actions of a UI component issued using the data storage management GUI, where the highest count has the highest relative ranking and priority, and where the lowest count has the lowest relative ranking and priority. In this alternative, there is no minimum percentage requirement or criterion as discussed above when filtering the particular counts and actions for which a priority is determined.

Referring to FIG. 5A, shown is an example of information that may be included in a table used in an embodiment in accordance with the techniques herein. The table 200 may be generated by the usability service discussed herein. The table 200 may be stored in the database 640 of FIG. 3. The table 200 includes the following columns of information: interface or source 201a, area 201b, UI component 201c, action 201d, count 201e and priority 201e. Each row or entry of the table 200 includes information for a single action (identified in column 201d) within a particular UI component (identified in column 201c) and for a single supported source or interface (identified in column 201a). The source column 201a includes one of 3 values denoting one of the 3 supported source or interfaces. In this example, the 3 values are GUI denoting the data storage system management GUI, CLI, and API denoting the REST API. A priority is only determined for those rows having GUI in column 201a.

As described above such as in connection with FIG. 4B, processing may be performed to determine percentages for the actions counts of the rows of 200.

In this example 200, the rows 202, 204 and 206 of 220 include information for the same action, provision storage, in the 3 different supported interfaces. Processing may be performed to determine percentages for the actions counts of the single action of provision storage in the rows of 220. The percentage for the action count 80 of the row 202 is 80% (e.g., 80/(80+20+0)). The percentage for the action count 20 of the row 204 is 20% (e.g., 20/(80+20+0)). The percentage for the action count 0 of the row 206 is 0% (e.g., 0/(80+20+0)). Within the single UI component, storage group list view, priorities may be assigned to each action of the UI component having a corresponding row in the table for a source of GUI and where the percentage of the row is at least the minimum threshold percentage, such as at least 80%. In this case, since there is only a single action in this particular UI component, storage group list view, a priority of 1 may be determined for the row 202. In at least one embodiment, actions of each UI component may be assigned a relative priority that is an integer value beginning with 1 as the highest priority. The lower the number, the higher the priority of an associated action for a GUI source.

In this example 200, the rows of 222 are associated with multiple actions included in the same UI component, SRDF Groups view. The rows 208, 210 and 212 of 223 include information for the same action, create SRDF group, in the 3 different supported interfaces. Processing may be performed to determine percentages for the actions counts of the rows of 223. The percentage for the action count of 0 in each of the rows 208 and 212 is 0% (e.g., 0/(100+0+0)). The percentage for the action count of 100 in the row 212 is 100% (e.g., 100/(100+0+0)).

The remaining rows 214, 216 and 218 each include information for a different action for the GUI source. In this example 200, there are no entries for the remaining 2 sources and processing may determine that counts for such actions and sources are 0. In this case, each of the rows 214, 216 and 218 has an associated percentage of 100%.

Processing may assign priorities to the actions of the UI component, SRDF Groups view, where each such action has a source of GUI and an associated percentage for the action's count that is at least the minimum threshold percentage, such as 80%. The rows 210, 214, 216 and 218 and associated percentages are examined and meet the minimum threshold of 80%.

Subsequently, a priority may be assigned to rows 210, 214, 216 and 218 based on their respective actions counts where the greater the action count, the higher the priority. In this case, the rows 210, 214, 216 and 218 are respectively assigned the priorities of 1, 2, 3 and 4 as denoted by the values in the column 201e.

Figure 5B:
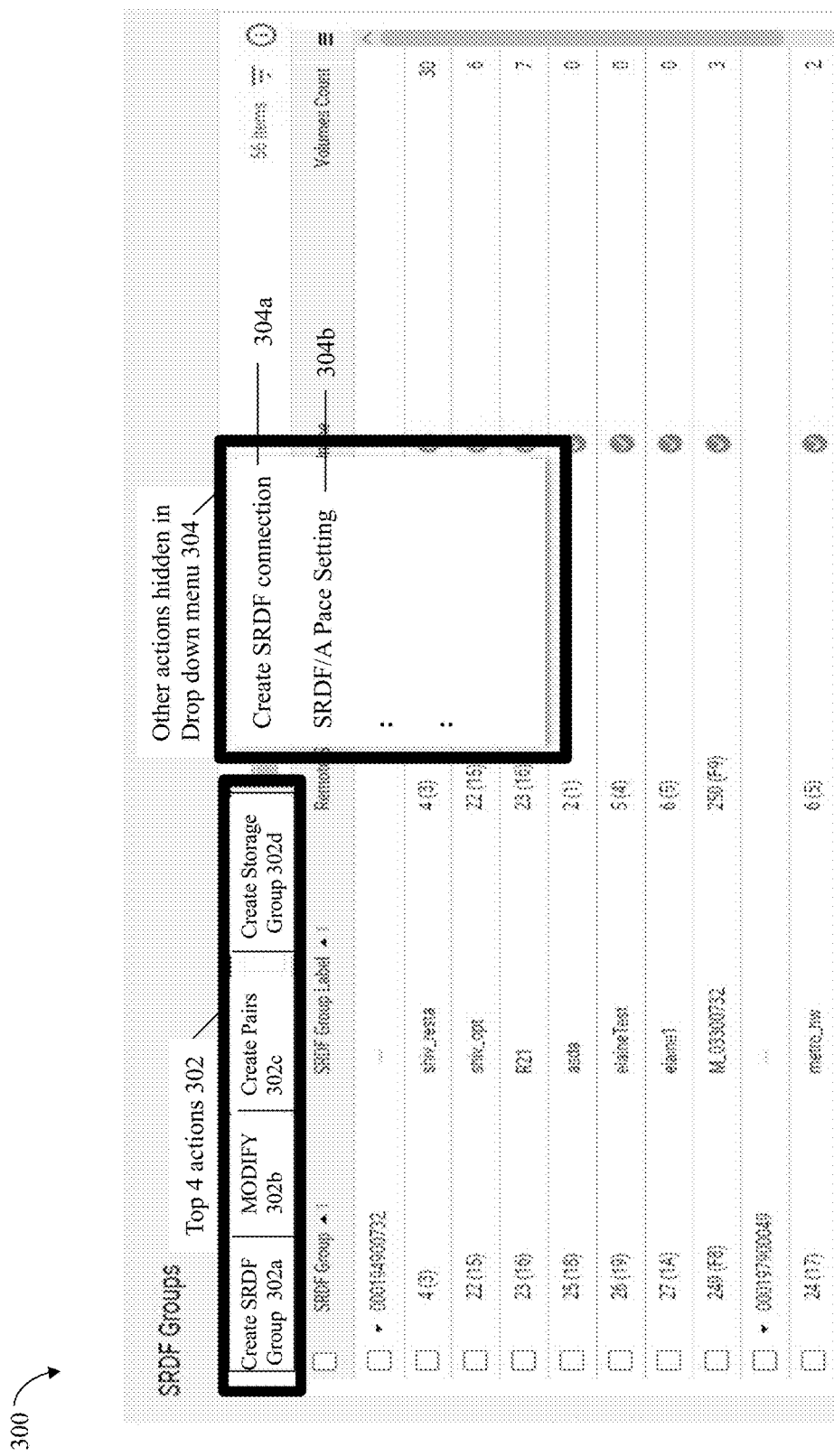
FIGS. 5B, 6B and 7 are examples of screenshots including restructured UI components in an embodiment in accordance with the techniques herein.

Referring to FIG. 5B shown is an example of a screenshot of the GUI that may be displayed in an embodiment in accordance with the techniques herein. The example 300 includes a UI component of actions having an arrangement, organization and structure determined in accordance with the priorities in the table 200 of FIG. 5A. The elements 302 and 304 may collectively denote the UI component SRDF Groups View associated with the rows 222 of the table 200 of FIG. 5A. The element 302 includes 4 UI elements that are selectable buttons each associated with an action. The element 304 is a drop down list or menu of selectable entries each associated with an action. The UI component may be organized in an arrangement of actions where the top 4 ranked actions have associated buttons in 302, and the remaining actions have associated entries in 304. As can be seen in the example 300, the button 302a corresponds to the priority 1 action as denoted by the row 210 of the table 200; the button 302b corresponds to the priority 2 action as denoted by the row 214 of the table 200; the button 302c corresponds to the priority 3 action as denoted by the row 216 of the table 200; and the button 302d corresponds to the priority 4 action as denoted by the row 218 of the table 200.

Although the table 200 does not include rows for any additional actions of the UI component SRDF Groups View where such additional actions are included in the menu 304, it may be assumed that counts for such additional actions are 0. However, if there were additional rows in the table 200 for such actions that also had associated priorities, the 4 actions having the top 4 priorities have associated buttons in 302. Additionally, the remaining actions may be included in the menu 304 listed, from top to bottom, in terms of decreasing priorities. For example the action create SRDF connection has priority 5 and is listed in 304 as the first item 304a, the action SRDF/A pace setting has priority 6 and is listed in 304 as the second item 304b and so on.

Generally, the UI component SRDF Groups View, that includes the buttons 302 and the menu 304 includes actions associated with SRDF groups. SRDF is described elsewhere herein as a remote data facility. SRDF groups denote an R1 group of LUNs and a remote R2 group of LUNs where data from the R1 group LUN are remotely replicated to corresponding LUNs in the R2 group. For example, selection of the button 302a results in performing subsequent steps to create an SRDF group; selection of the button 302b results in performing subsequent steps to modify an existing SRDF group; selection of the button 302c results in performing subsequent steps to create or define a pair of SRDF groups, such as associating an R1 group of LUNs with an R2 group of LUNs; and selection of the button 302d results in performing subsequent steps to create an SG. In a similar manner, selection of menu item 304a results in performing subsequent steps to create an SRDF connection, selection of menu item 304b results in performing subsequent steps related to SRDF/A pace setting, and the like.

It should be noted that SRDF/A refers to the remote replication data facility SRDF executing in asynchronous. A remote data facility (RDF), such as SRDF, performing remote replication as described herein may perform write pacing with respect to host writes to a LUN, or a defined SRDF group of LUNs, that is remotely replicated using SRDF. The write pacing is performed to prevent conditions that may result in cache overflow on both the R1 and R2 data storage systems. In at least one embodiment, processing may be performed to detect when the replication write I/O rate (e.g., for writes used to replicate data from the R1 LUN to the remote R2 LUN) is less than host write I/O rates. A corrective action may then be performed to slow down or pace the host I/O rates to more closely match the RDF write I/O service rates. Thus, a write paced delay metric indicates the average amount of this delay introduced per write I/O operation for writes that replicate data from the R1 device and system to the R2 device and system. To this end, selection of the action 304b may result in performing subsequent steps to set options regarding write pacing. The options may include, for example, enabling or disabling write pacing for a defined R1-R2 SRDF group pair.

Referring to FIG. 6A, shown is an example of another table that may be used in an embodiment in accordance with the techniques herein. The table 400 may include columns 401a-f that are respectively analogous to columns 201a-f of FIG. 5A. The example 400 includes rows and associated actions for the same single UI component, SG list view, that lists defined SGs and includes actions performed in connection with SGs.

What will now be described is processing that may be performed in connection with determining the priorities in the column 401f. Consistent with other discussion herein, percentages may determined for each action count of a row in the table 400.

Element 430 denotes 3 rows of the table 400 associated with the action create SG. in the 3 different supported sources or interfaces. The percentage for the action count 100 of the row 402 is 98% (e.g., 100/(100+1+1)). The percentage for the action count 1 for each of the rows 404 and 406 204 is 1% (e.g., 1/(100+1+1)).

Element 432 denotes 2 rows of the table 400 associated with the action provision for 2 of the 3 different supported sources or interfaces. It may be assumed that the remaining missing source, CLI, for the action provision has an associated count of 0. The percentage for the action count 89 of the row 408 is 89%. The percentage for the action count 11 for the row 410 is 11%.

Element 434 denotes 2 rows of the table 400 associated with the action modify SG for 2 of the 3 different supported sources or interfaces. It may be assumed that the remaining missing source, CLI, for the action modify SG has an associated count of 0. The percentage for the action count 90 of the row 412 is 90%. The percentage for the action count 10 for the row 414 is 10%.

Element 436 denotes 2 rows of the table 400 associated with the action protect for 2 of the 3 different supported sources or interfaces. It may be assumed that the remaining missing source, CLI, for the action protect has an associated count of 0. The percentage for the action count 80 of the row 416 is 80%. The percentage for the action count 20 for the row 418 is 20%.

Element 438 denotes 2 rows of the table 400 associated with the action set host I/O limits for 2 of the 3 different supported sources or interfaces. It may be assumed that the remaining missing source, CLI, for the action set host I/O limits has an associated count of 0. The percentage for the action count 9 of the row 420 is 90%. The percentage for the action count 1 for the row 422 is 10%.

Element 440 denotes 2 rows of the table 400 associated with the action migrate for 2 of the 3 different supported sources or interfaces. It may be assumed that the remaining missing source, CLI, for the action migrate has an associated count of 0. The percentage for the action count 2 of the row 426 is 67%. The percentage for the action count 1 for the row 428 is 33%.

It should be noted that there are no percentages determined for the actions of the rows 424 and 430 since these actions have no rows in the table with the source of GUI.

The rows of the table having a source of GUI are 402, 408, 412, 416, 420 and 428. Priorities are determined for the rows 402, 408, 412, 416 and 420 since each such row has an associated percentage noted above that exceeds the minimum threshold percentage of 80%. However, no priority is determined for the row 428 since it has an associated percentage of 33% that is less than the minimum threshold percentage of 80%. The action counts of the rows 402, 408, 412, 416 and 420 may be sorted in decreasing order where priorities are assigned, from highest to lowest, based on the sorted ordering. Thus, the highest count is assigned the highest priority and the lowest count is assigned the lowest priority. Based on the counts in the column 401e for the rows 402, 408, 412, 416 and 420, the rows 402, 408, 412, 416 and 420 may be assigned the following respective priorities: 1, 3, 2, 4 and 5.

Figure 6B:
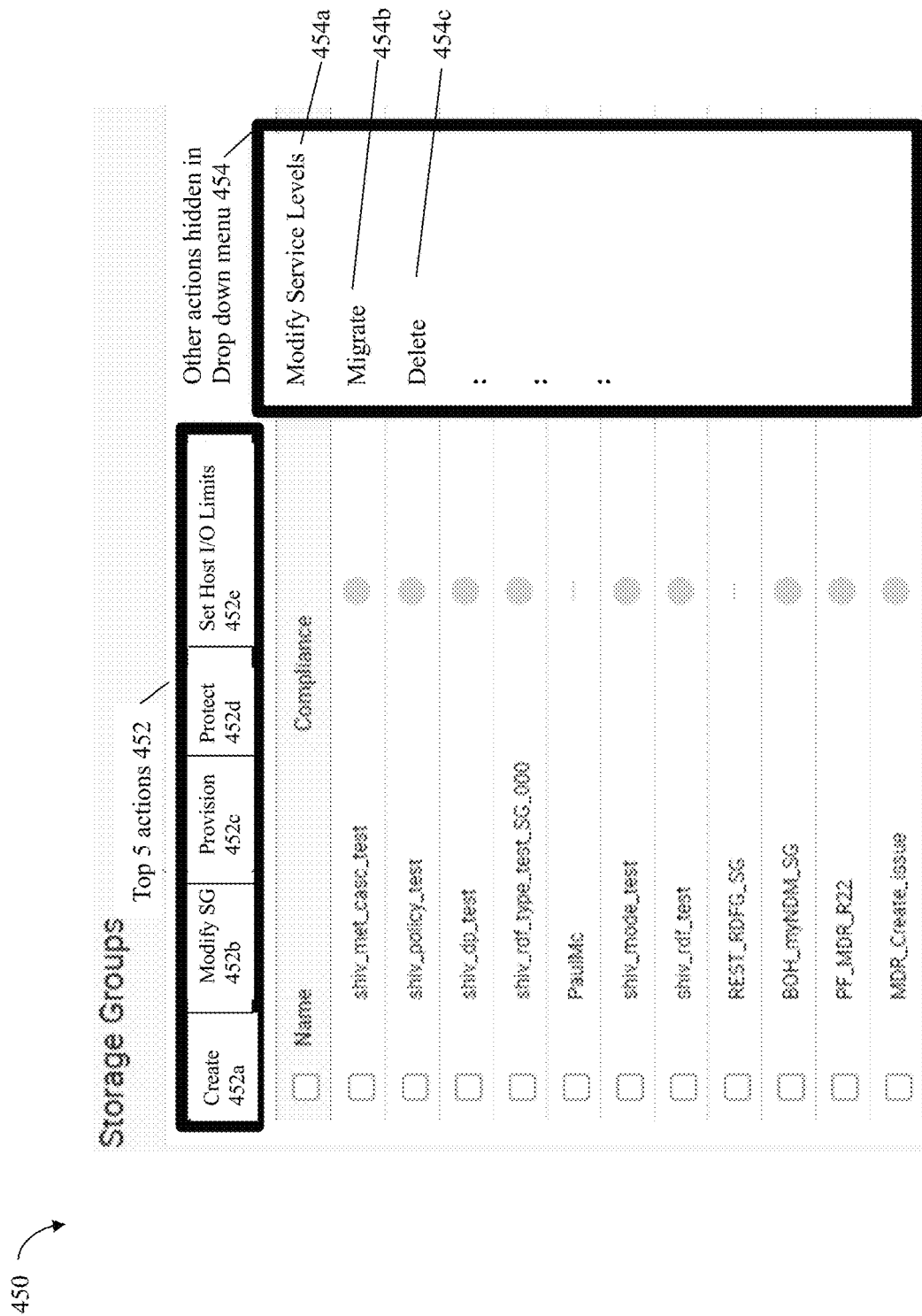

Referring to FIG. 6B shown is an example of a screenshot of the GUI that may be displayed in an embodiment in accordance with the techniques herein. The example 450 includes a UI component of actions having an arrangement, organization and structure determined in accordance with the priorities in the table 400 of FIG. 6A. The elements 452 and 454 may collectively denote the UI component SG list view associated with the rows of the table 400 of FIG. 6A. The element 452 includes 5 UI elements that are selectable buttons each associated with an action. The element 454 is a drop down list or menu of selectable entries each associated with an action.

The UI component SG list view may be organized in an arrangement of actions where the top 5 ranked actions have associated buttons in 452, and the remaining actions have associated entries in 454. As can be seen in the example 450, the button 452a corresponds to the priority 1 action as denoted by the row 402 of the table 400; the button 452b corresponds to the priority 2 action as denoted by the row 412 of the table 400; the button 452c corresponds to the priority 3 action as denoted by the row 408 of the table 400; the button 452d corresponds to the priority 4 action as denoted by the row 416 of the table 400; and the button 452e corresponds to the priority 5 action as denoted by the row 420 of the table 400. The remaining actions for the SG list view UI component include modify service level (as denoted by the row 424 of FIG. 6A), migrate (as denoted by the rows 426 and 428 of FIG. 6A), and delete (as denoted by the rows 430 of FIG. 6A). The foregoing 3 remaining actions may be included in the menu 454 as denoted by the entries 454a-c. It should be noted that in this example, no priorities may be included in the table 400 for the actions migrate, delete and modify service levels. As such, an embodiment may determine an ordering for such actions on the menu 454 using any suitable technique, such as based on a predefined or default ordering.

Figure 7:
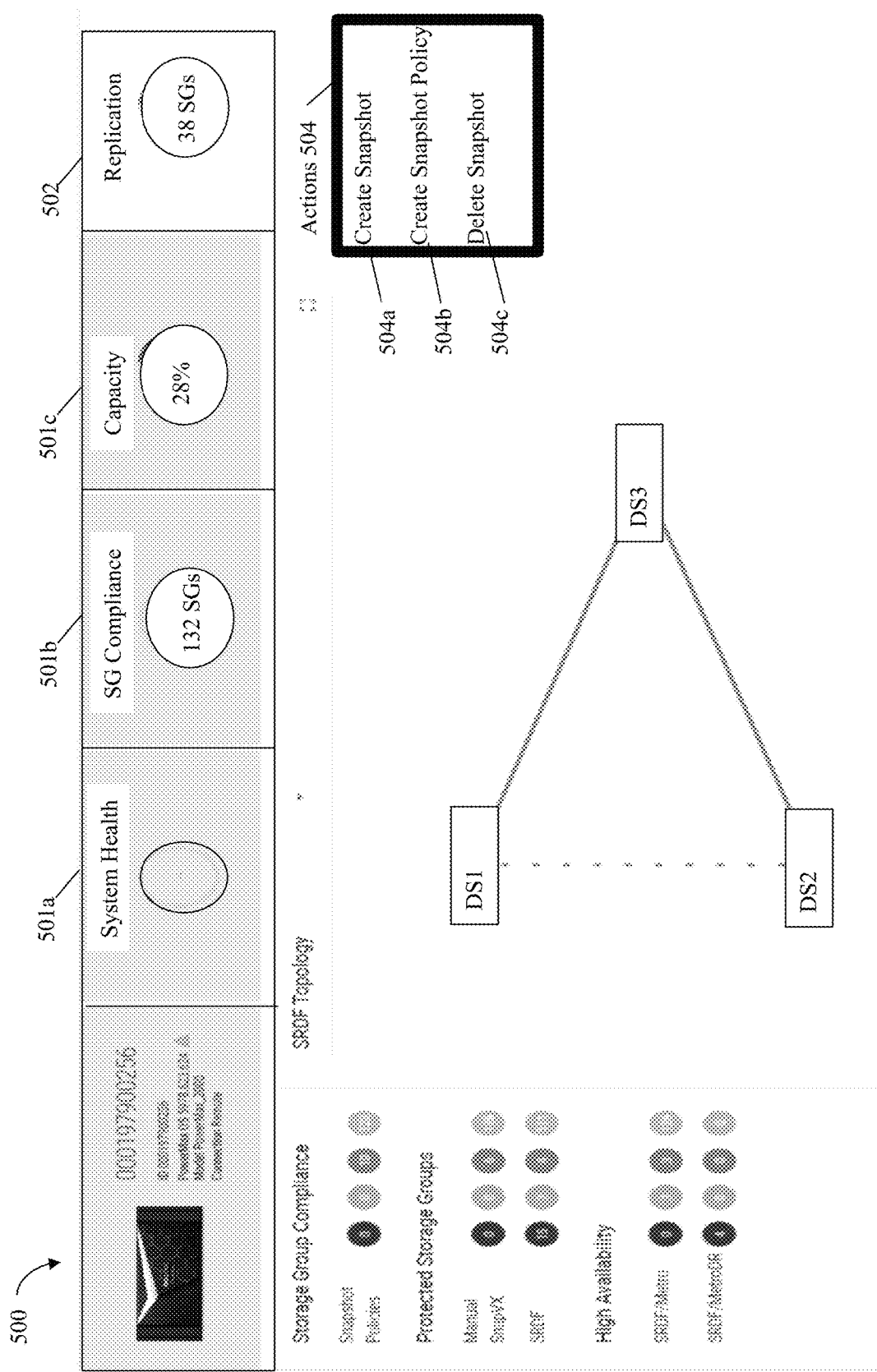

Referring to FIG. 7, shown is another example of a screenshot of the GUI that may be displayed in an embodiment in accordance with the techniques herein. The example 500 illustrates a dashboard of different storage areas including system health 501a, SG compliance 501b, capacity 501c, and replication 502.

The example 500 includes a UI component 504 that is a menu or drop down list of actions having an arrangement, organization and structure determined in accordance with priorities determined for the top 3 actions of a replication dashboard. The actions of 504 may be displayed, for example, responsive to a user navigating over the replication UI element 502. The name or identifier of the UI component 504 may be replication list. Although no table of priorities and other information is illustrated in the FIG. 7, a table with entries may indicate the following as the top 3 actions of the UI component replication list: create snapshot, create snapshot policy, and delete snapshot. The foregoing 3 actions may have the highest priority of all actions of the UI component replication list. Assume that there are 10 actions associated with the UI component replication list. In this case, only the foregoing 3 of the 10 actions having the 3 highest priorities are displayed in the menu 504. The remaining 7 actions may not be included in the menu 504 and may therefore be omitted from the GUI display.

Described above are embodiments in which the priorities of actions are based on counts when the source is the GUI. As a variation, an embodiment may include a configuration option in which the user is allowed to indicate which one or more interfaces or sources have counts that are used to determine the priorities. For example, a user may configure the option to determine the percentages based on both the REST API and GUI sources. In this case, the percentage for a particular action is weighted or based on the counts of both the REST API and GUI sources for the action. To further illustrate, reference is made to the action create SG having corresponding rows 430 in the table 400 of FIG. 6A. The percentage for the action create SG may be determined as a ratio of the aggregated counts in row 402 and 404 with respect to the total counts of all 3 sources (e.g., (100+1)/(100+1+1)=99%). The priority for the action create SG in the UI component SG list view may be determined based on the combined counts (401e) of the rows 402 and 404 for the GUI and REST sources, where the combined counts total 101. In this manner, the techniques described herein may be performed based on a current setting of the configuration option identifying the one or more sources whose count is used when prioritizing the actions. By default, only the GUI source may be used as described above.

In at least one embodiment, the usage data regarding the particular interfaces or sources initiating the actions may be collective across multiple users or all users. In this case, the usage data used to determine priorities and construct the tables may be based the aggregated activities of all such users. As a variation, an embodiment may collect and analyze usage data on a per user level of granularity so that each table instance may be based on a single user's actions. In this variation, the table containing usage information for a single user may then be used in determining the structure and organization of the GUI for the particular user when logged into the data storage management application using the GUI.

The UI components having associated actions used with the techniques herein may include any one or more GUI elements such as one or more menus, one or more ribbons, one or more buttons, and the like. For example, the UI component of FIG. 5B included both buttons 302 as well as the menu or drop down list 304. As a variation, the UI component in the FIG. 7 only included the menu or drop down list 504. Also, as illustrated in connection with FIG. 7, the UI component organized and structured in accordance with the techniques herein may possibly result in removing actions from the GUI display that do not have a sufficiently high enough priority. For example, the UI component may be a menu may that includes only N items or may be a fixed number of N buttons to present N associated actions to the user via the GUI. However, in some cases there may be more than N actions associated with the UI component whereby only the top N ranked or highest N prioritized actions are included in the UI component of the GUI.

Described above are examples using the techniques herein to restructure or organize portions of the GUI based on counts of recorded user actions. In another aspect, the techniques herein may provide for restructuring or reorganizing the navigational workflow of an application such as the data storage management application having the GUI. Such restructuring may also be based on counts of recorded user actions associated with different views and UI components of the application workflow.

Referring to the FIG. 8A, shown is an example representing a hierarchical workflow of an application in an embodiment in accordance with the techniques herein. The structure 700 is a hierarchical structure having multiple levels or layers of nodes. In this example, the structure 700 may denote a tree of nodes, where the tree includes 5 levels of nodes. Each of the nodes may correspond to a view of a different navigations workflow point for the application. Level 1 includes the root node A and is the highest level in the structure. Level 2 includes the nodes B1-B3 and is the second highest level in the structure. Level 3 includes the nodes C1-C8 and is the third highest level in the structure. Level 4 includes the nodes D1-D2 and is the fourth highest level in the structure. Level 5 includes the nodes E1 and E2 and is the fifth highest or lowest level in the structure. Nodes at level 5 may also be referred to as leaf nodes. Nodes that are related to one another may be connected directly to one another or indirectly to one another through one or more other nodes.

Each node in the structure other than the leaf nodes may have one or more child nodes located at the next lower level. For example, node A has child nodes B1, B2 and B3, where node A is also referred to as the parent node of the nodes B1, B2 and B3. The structure 700 may represent a default or initial navigational workflow of an application having a GUI where a user may navigate via UI selections between connected nodes in the structure. Node A may denote the initial view or screenshot presented to a user in the GUI for the application. A user may perform an action such as by making a selection of a UI element and navigate to one of 3 other views or screenshots denoted by the nodes B1-B3. Generally, a user may navigate between different views represented as connected nodes in the structure. A path in the structure from the root node A to any other node at a lower level represents a navigational workflow path that a user may take. For example, a user may navigate to views denoted by the node E1 by making various UI selections to transition along the nodes of the following path: A, B2, C3, D1, E1. In this case, the user wishing to perform an action or view information displayed in the view E1 must navigate to the lower point at level 5 in the application workflow. Similarly, a user may navigate to views denoted by the node E2 by making various UI selections to transition along the nodes of the following path: A, B2, C3, D1, E2. In this case, the user wishing to perform an action or view information displayed in the view E2 must navigate to the lower point at level 5 in the application workflow. The techniques herein may be used to record usage counts associated with the different views and navigational workflow points represented by the nodes in the structure 700. In at least one embodiment, a count may be associated with each of the different nodes in the structure 700. If a user frequently navigates to the views E1 and E2, the usage counts of the views E1 and E2 and those nodes included in the navigational workflow paths to E1 and E2 will be higher than all other usage counts of the other nodes.

An embodiment may restructure the application workflow represented by the structure 700 based on the usage counts associated with the nodes, such as E1 and E2. In this example, analysis of the usage counts of the nodes in the structure 700 may indicate a frequent navigational workflow to E1 and E2. In this case, processing may determine to move the views associated with E1 and E2 up in the application workflow. For example, rather than require the user to navigate to level 5 to access the views E1 and E2, the application workflow may be restructured to move the views associated with E1 and E2 to a higher level in the application workflow. In at least one embodiment, based on the high usage counts of the nodes E1 and E2 and also D1, the nodes D1, E1 and E2 may be relocated as a group 702 to a level 2 of the structure as illustrated in the FIG. 8B.

Figure 8B:
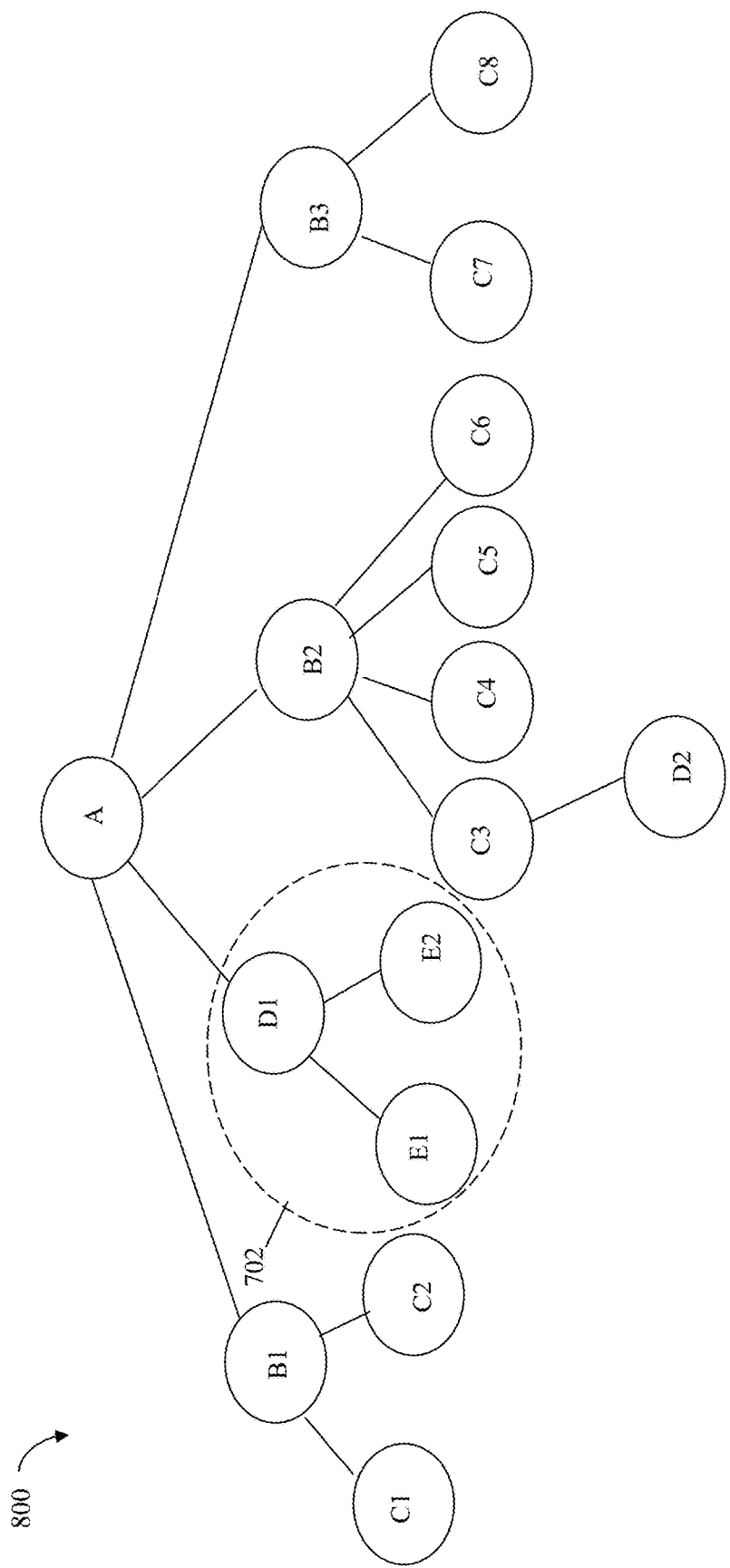

Referring to FIG. 8B, shown is an example representing the restructured hierarchical workflow of the application in an embodiment in accordance with the techniques herein. The structure 800 is a hierarchical structure having multiple levels or layers of nodes as described I connection with FIG. 8A. However, in the restructured workflow, the node D1 has been relocated to level 2 in the hierarchy and the nodes E1 and E2 have been relocated to level 3 in the hierarchy. The foregoing is one example of how the application workflow may be restructured to generally move views that are frequently accessed up to higher levels in the application workflow. In a similar manner, the techniques herein may be used to relocate less frequently accessed views and corresponding nodes to lower levels in the application workflow.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of rendering information for display in a graphical user interface (GUI) of an application comprising:
navigating to a point in a workflow of the application;
responsive to navigating to the point in the workflow of the application, performing processing to render a first component in the GUI of the application, wherein the first component includes a plurality of user interface elements for a plurality of actions, wherein the processing includes:
receiving a plurality of priorities for the plurality of actions of the first component, wherein each of the plurality of priorities denotes a priority of one of the plurality of actions relative to remaining ones of the plurality of actions and wherein the plurality of priorities is determined in accordance with frequencies of usage of the GUI of the application to perform the plurality of actions;
organizing the plurality of user interface elements for the plurality of actions in a first arrangement in accordance with the plurality of priorities; and
rendering the first component using the first arrangement of the plurality of user interface elements for the plurality of actions; and
analyzing usage information indicating a number of times each of a plurality of allowable interfaces has been used to perform each of the plurality of actions, wherein said usage information includes a first count denoting usage of the GUI to perform a first action of the plurality of actions, a second count denoting usage of an application programming interface (API) to perform the first action, and a third count denoting usage of a command line interface (CLI) to perform the first action, and wherein said analyzing includes:
determining a first percentage denoting a percentage of time the GUI is used to perform the first action with respect to a total number of times the plurality of allowable interfaces is used to perform the first action, wherein the plurality of allowable interfaces includes the GUI, the CLI and the API;
determining that the first percentage exceeds a minimum percentage; and
responsive to determining the first percentage exceeds the minimum percentage, determining a corresponding priority of the plurality of priorities for the first action relative to remaining ones of the plurality of actions using a ranking of counts denoting usage of the GUI to perform the plurality of actions.

2. The method of claim 1, wherein a request to perform any of the plurality of actions is issued from one of the plurality of allowable interfaces including the GUI of the application, the API and the CLI.

3. The method of claim 2, further comprising:
   determining the plurality of priorities in accordance with said analyzing of the usage information.

4. The method of claim 3, wherein the usage information includes a plurality of counts, and wherein said determining the plurality of priorities uses the plurality of counts denoting frequencies of usage of the GUI of the application to perform the plurality of actions, and wherein each of the plurality of counts denotes a frequency of usage of the GUI of the application to perform a different one of the plurality of actions.

5. The method of claim 4, wherein the plurality of counts includes the first count indicating a frequency of usage of the GUI of the application for performing the first action of the plurality of actions and a fourth count indicating a frequency of usage of the GUI of the application for performing a second action of the plurality of actions, wherein the first count is greater than the fourth count, wherein the first action has a first priority of the plurality of priorities and the second action has a second priority of the plurality of priorities, and wherein the first priority is higher than the second priority.

6. The method of claim 5, wherein the first component includes only N user interface elements for N of the plurality of actions having the highest N priorities of the plurality of priorities, and wherein N is an integer greater than 0.

7. The method of claim 5, wherein the usage information includes a second plurality of counts denoting frequencies of usage of the API to perform the plurality of actions, and wherein the usage information includes a third plurality of counts denoting frequencies of usage of the CLI to perform the plurality of actions.

8. The method of claim 7, further comprising performing first processing including:
   using the plurality of counts, the second plurality of counts, and the third plurality of counts to determine a plurality of percentages of time the GUI of the application is used to perform said plurality of actions, where each of the plurality of percentages corresponds to a different one of the plurality of actions;
   for each of the plurality of percentages of time, determining whether said each percentage of time corresponding to one of the plurality of actions is at least the minimum percentage; and
   responsive to determining said percentage of time for corresponding to said one action is at least the minimum percentage, determining a priority for said one action, and otherwise not determining a priority for said one action.

9. The method of claim 8, wherein the GUI of the application is used to perform a third action a third percentage of time that is less than the minimum percentage, and the method includes not determining a priority for the third action.

10. The method of claim 8, wherein the priority for each of the plurality of actions is a relative priority based on a ranking of the plurality of counts denoting frequencies of usage of the GUI of the application to perform the plurality of actions.

11. The method of claim 1, wherein the application is a data storage management application.

12. The method of claim 11, wherein each of the plurality of actions is a data storage system management request sent over a control path.

13. The method of claim 1, wherein prior to navigating to the point in the workflow of the application, the first component has the plurality of user interface elements for the plurality of actions organized in a second arrangement that is different than the first arrangement, and wherein the processing includes:
   determining whether a user, that has navigated to the point in the workflow of the application, has logged into the application at least a minimum number of times within a specified time period, wherein the minimum number of times is an integer value greater than one; and
   responsive to determining that the user has logged into the application at least the minimum number of times within the specified time period, performing said receiving, said organizing and said rendering the first component using the first arrangement, and otherwise rendering the first component using the second arrangement of the plurality of user interface elements of the plurality of actions.

14. The method of claim 1, wherein the first percentage is determined as a ratio of the first count with respect to the total number of times, wherein the total number of times denotes a mathematical sum of the first count denoting usage of the GUI to perform the first action, the second count denoting usage of the API to perform the first action, and the third count denoting usage of the CLI to perform the first action.

15. A system comprising:
   one or more processors; and
   one or more memories comprising code stored thereon that, when executed, performs a method of rendering information for display in a graphical user interface (GUI) of an application comprising:
      navigating to a point in a workflow of the application;
      responsive to navigating to the point in the workflow of the application, performing processing to render a first component in the GUI of the application, wherein the first component includes a plurality of user interface elements for a plurality of actions, wherein the processing includes:
         receiving a plurality of priorities for the plurality of actions of the first component, wherein each of the plurality of priorities denotes a priority of one of the plurality of actions relative to remaining ones of the plurality of actions and wherein the plurality of priorities is determined in accordance with frequencies of usage of the GUI of the application to perform the plurality of actions;
         organizing the plurality of user interface elements for the plurality of actions in a first arrangement in accordance with the plurality of priorities; and
         rendering the first component using the first arrangement of the plurality of user interface elements for the plurality of actions; and
      analyzing usage information indicating a number of times each of a plurality of allowable interfaces has been used to perform each of the plurality of actions, wherein said usage information includes a first count denoting usage of the GUI to perform a first action of the plurality of actions, a second count denoting usage of an application programming interface (API) to perform the first action, and a third count denoting usage of a command line interface (CLI) to perform the first action, and wherein said analyzing includes:
         determining a first percentage denoting a percentage of time the GUI is used to perform the first action with respect to a total number of times the plurality of allowable interfaces is used to perform the first action, wherein the plurality of allowable interfaces includes the GUI, the CLI and the API;

determining that the first percentage exceeds a minimum percentage; and responsive to determining the first percentage exceeds the minimum percentage, determining a corresponding priority of the plurality of priorities for the first action relative to remaining ones of the plurality of actions using a ranking of counts denoting usage of the GUI to perform the plurality of actions.

16. A non-transitory computer readable medium including code stored thereon that, when executed, performs a method of rendering information for display in a graphical user interface (GUI) of an application comprising:

navigating to a point in a workflow of the application;

responsive to navigating to the point in the workflow of the application, performing processing to render a first component in the GUI of the application, wherein the first component includes a plurality of user interface elements for a plurality of actions, wherein the processing includes:

receiving a plurality of priorities for the plurality of actions of the first component, wherein each of the plurality of priorities denotes a priority of one of the plurality of actions relative to remaining ones of the plurality of actions and wherein the plurality of priorities is determined in accordance with frequencies of usage of the GUI of the application to perform the plurality of actions;

organizing the plurality of user interface elements for the plurality of actions in a first arrangement in accordance with the plurality of priorities; and rendering the first component using the first arrangement of the plurality of user interface elements for the plurality of actions; and analyzing usage information indicating a number of times each of a plurality of allowable interfaces has been used to perform each of the plurality of actions, wherein said usage information includes a first count denoting usage of the GUI to perform a first action of the plurality of actions, a second count denoting usage of an application programming interface (API) to perform the first action, and a third count denoting usage of a command line interface (CLI) to perform the first action, and wherein said analyzing includes:

determining a first percentage denoting a percentage of time the GUI is used to perform the first action with respect to a total number of times the plurality of allowable interfaces is used to perform the first action, wherein the plurality of allowable interfaces includes the GUI, the CLI and the API;

determining that the first percentage exceeds a minimum percentage; and responsive to determining the first percentage exceeds the minimum percentage, determining a corresponding priority of the plurality of priorities for the first action relative to remaining ones of the plurality of actions using a ranking of counts denoting usage of the GUI to perform the plurality of actions.

17. The non-transitory computer readable medium of claim 15, wherein a request to perform any of the plurality of actions is issued from one of the plurality of allowable interfaces including the GUI of the application, the API and the CLI.

18. The non-transitory computer readable medium of claim 16, wherein the method further comprises:

determining the plurality of priorities in accordance with said analyzing of the usage information.

19. The non-transitory computer readable medium of claim 18, wherein the usage information includes a plurality of counts, and wherein said determining the plurality of priorities uses the plurality of counts denoting frequencies of usage of the GUI of the application to perform the plurality of actions, and wherein each of the plurality of counts denotes a frequency of usage of the GUI of the application to perform a different one of the plurality of actions.

\* \* \* \* \*